United States Patent

Kaneko et al.

[11] Patent Number: 5,861,180
[45] Date of Patent: Jan. 19, 1999

[54] POWDER FEED APPARATUS AND CONTROL METHOD THEREOF

[75] Inventors: Hideo Kaneko; Kazutami Takahashi; Kiyoshi Ogawa, all of Nagaoka, Japan

[73] Assignee: Tamagawa Machinery Co., Ltd., Nagaoka, Japan

[21] Appl. No.: 637,841

[22] Filed: Apr. 25, 1996

[30] Foreign Application Priority Data

Apr. 26, 1995 [JP] Japan .................................. 7-125825

[51] Int. Cl.[6] .............................................. B29C 43/58
[52] U.S. Cl. ........................ 425/145; 425/260; 425/448; 425/171; 425/150
[58] Field of Search .................................. 425/138, 352, 425/361, 145, 150, 169, 171, 258, 260, 448

[56] References Cited

U.S. PATENT DOCUMENTS

3,909,167   9/1975   Signora ................................... 425/352
5,407,339   4/1995   Fehlhafer ............................... 425/361

*Primary Examiner*—Jan H. Silbaugh
*Assistant Examiner*—Kenneth M. Jones
*Attorney, Agent, or Firm*—Evenson, McKeown, Edwards & Lenahan, PLLC

[57] ABSTRACT

In a powder feed apparatus and a control method thereof, a powder molding press feeds powder from a hopper of the powder feed apparatus to a feeder slidably disposed on a die plate of the press proper. Powder is charged into a die in the die plate. The feeder is electronically controlled to a correct position on the die. Powder is fed from a powder feed apparatus into a feeder slidably disposed on a die plate of a press proper and a feeder drive motor is servo-controlled by an output obtained by comparing detection outputs from a position detector for detecting the vertical position of the die plate of the press proper and a position detector for detecting the position of the feeder in its sliding direction. As a result, it is possible to avoid the trouble of changing cams or inserting insert cams every time the shape of the compact being molded changes. It is also possible to easily make changes to the movement speed of the feeder in correspondence with changes to the compact.

1 Claim, 10 Drawing Sheets

POWDER FEED APPARATUS AND CONTROL METHOD THEREOF

BACKGROUND OF THE INVENTION

This invention relates to a powder feed apparatus and a powder feed apparatus control method for feeding powder into a powder molding press for molding powder.

Various powder feed apparatuses for feeding powder into a die on a die plate when press-molding a compact of a predetermined shape using a powder molding press have been proposed. As these powder feed apparatuses, hose types, shutter types and rotary types and the like have been proposed. For example, a shutter type powder feed apparatus is one wherein a fixed quantity of powder from powder stored in a hopper is fed into a die by a shutter being opened and closed, and a rotary type powder feed apparatus is one wherein powder in a hopper is fed in a fixed quantity into a die by a rotary shutter interposed between the hopper and a feeder being rotated.

Figure 12:
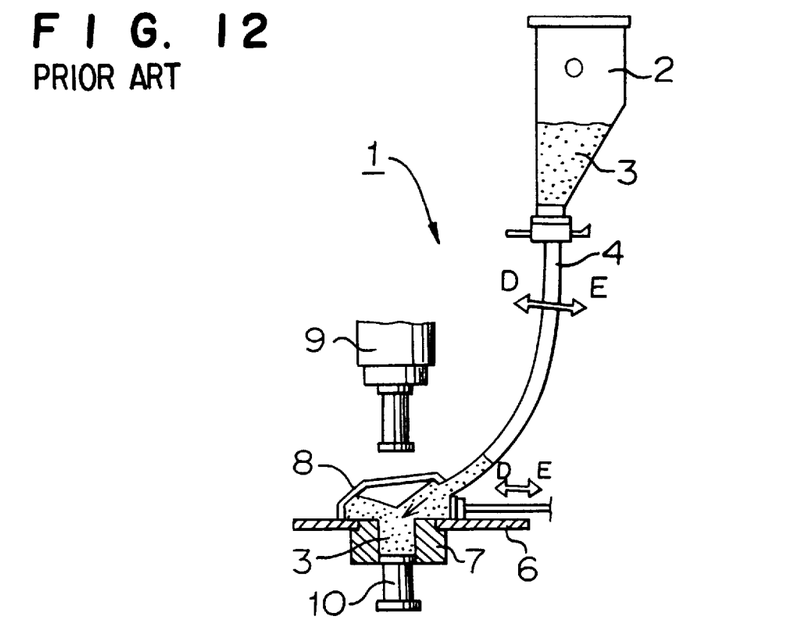
FIG. 12 is a sectional side view of a main part of a conventional powder feed apparatus.

FIG. 12 is a sectional side view of a main part of a conventional hose type powder feed apparatus. This overall powder feed apparatus 1 feeds a fixed quantity of a powder 3 stored in a hopper 2 through a hose 4 into a feeder 8 disposed on the upper side of a die 7 mounted on a die plate 6 of a powder molding press 5.

With the feeder 8 moved in the direction E together with the hose 4, by cooperative movement of an upper punch 9 and a lower punch 10 of the powder molding press 5, powder 3 inserted into the die 7 is compressed to form a compact. By the feeder 8 being moved over the die plate 6 in the direction E, the powder in the feeder 8 is scraped into the die 7 so that a predetermined quantity of powder 3 remains in the die 7 only.

Figure 13:
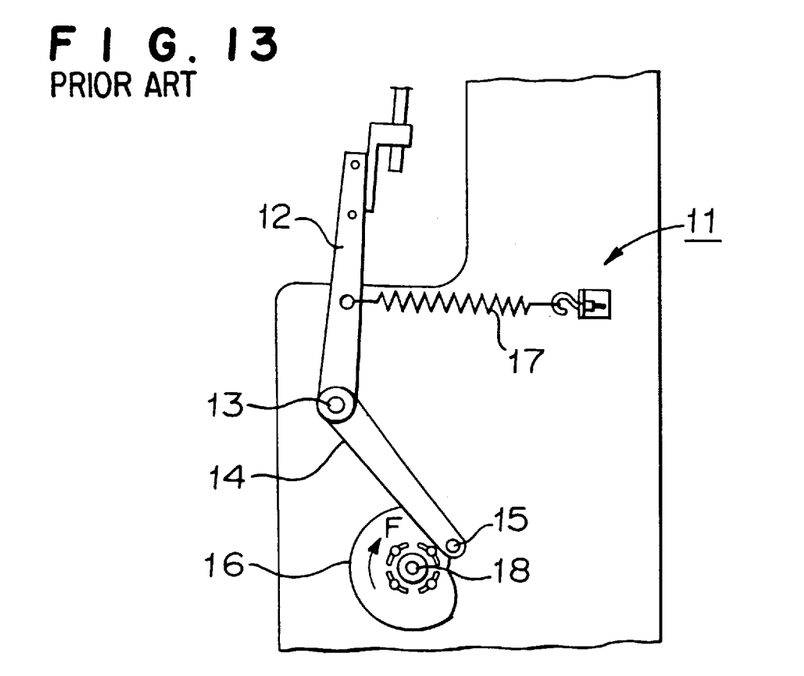
FIG. 13 is a view illustrating a main part of a linkage construction used in a conventional powder feed apparatus.

As a driving device for sliding this feeder 8 in the arrow D–E direction, the kind of cam type driving device shown in FIG. 13 has been widely used. FIG. 13 is a view showing part of a feeder driving mechanism 11 and illustrating the operation thereof, wherein a rotational force of a motor or the like is applied to the end of a first feeder lever 12, the first feeder lever 12 converts this rotational force into an oscillating direction force and about a support point 13 as center forms a pushing force by means of a biasing force of a spring 17 toward a pin 15 provided on the end of a second lever 14. The pin 15 is abutted with the cam 16 and the cam 16 is rotated for example clockwise as shown by the arrow F. The feeder 8 is linked to a cam shaft 18 and the feeder 8 is caused to slide along the die plate 6 in the arrow D–E (see FIG. 12) direction.

The cam surface of the cam 16 is formed to predetermine the sliding direction of the feeder 8 over the die 7 and the speed thereof and so on in accordance with the powder feed quantity and the material of the powder 3 and the like.

However, with the construction of the powder feed apparatus described above, there has been the problem that because it is necessary to form the cam surface of the cam 16 in advance so as to describe the movement curve of the feeder with a feeder cam, it has been necessary to exchange the cam 16 every time the shape of the compact being molded changes.

In recent years, powder-molding work lots have become smaller and more diverse, shapes of compacts also have from simple ones become complicated and large and furthermore there is a demand for moldings of special materials.

Affects of the quality of the powder during this kind of powder molding pressing, on nonuniformity of density of powder in the die, dispersion per unit weight and the accuracy of the thickness (and parallelism) of the compact and so on, constitute a problem, and to avoid the trouble of exchanging the cam every time the shape or material of the molded compact changes it has been made possible to combine insert cams with a cam serving as a base and make slight pattern changes using insert cams. That is, setting of the positions of the feeder 8 in its sliding direction on the die plate 6 has been carried out by positional adjustment of links, levers and insert cams and the like, but this adjustment work requires skill and its reproducibility is not good and this has been a cause of dispersion in compact products.

SUMMARY OF THE INVENTION

Accordingly, an object of this invention is to provide a powder feed apparatus and a powder feed apparatus control method which solve the above-mentioned problem points and with which it is possible to avoid the trouble of changing cams or inserting insert cams in correspondence with changes in the shapes of the compact being molded and it is possible to easily change the movement speed of a feeder in correspondence with changes to the compact.

Figure 1:
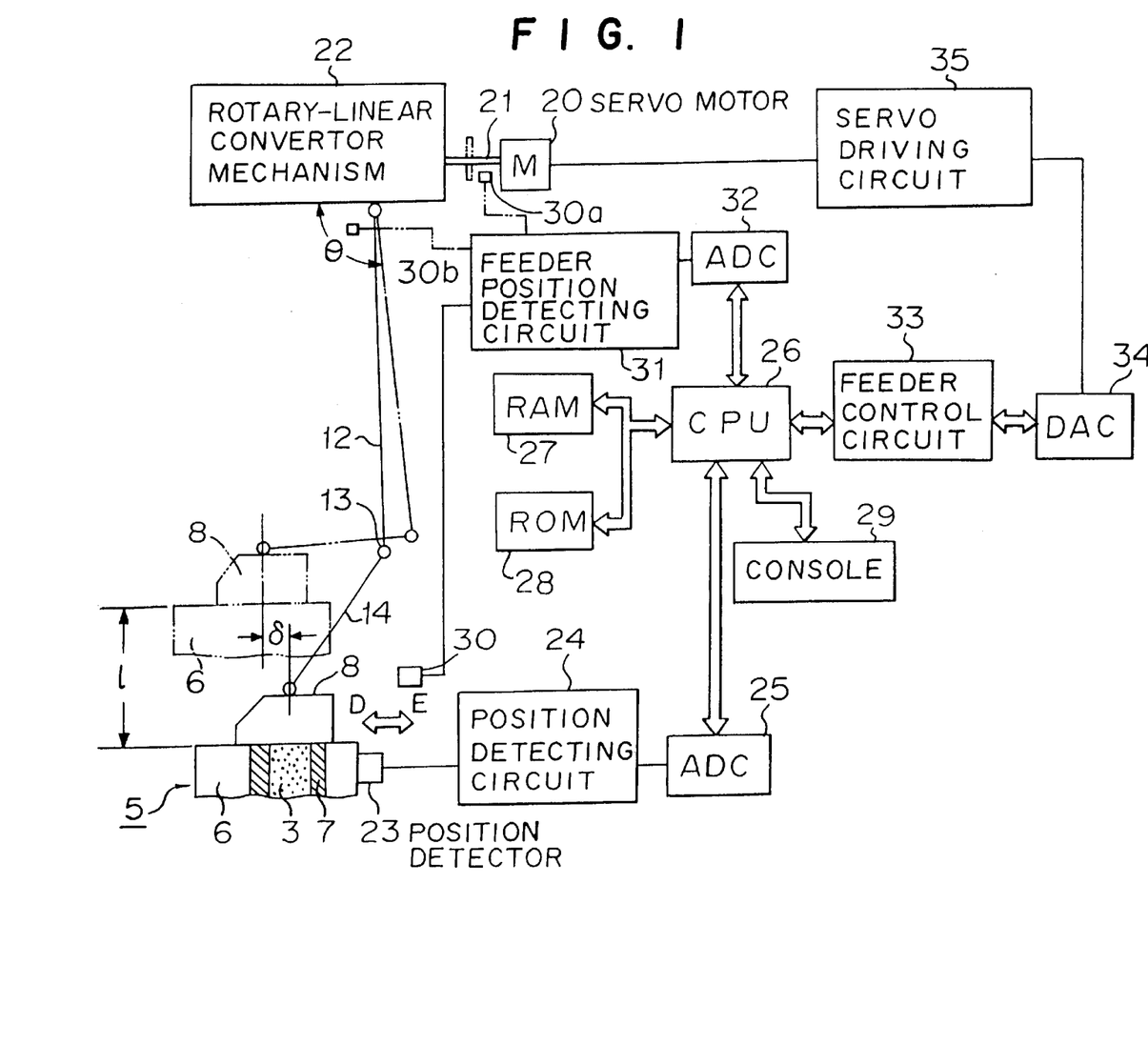
FIG. 1 is a system diagram showing a preferred embodiment of a powder feed apparatus and control method thereof according to the invention.

To achieve the above-mentioned object and other objects, a powder feed apparatus provided by the invention, as an example thereof is shown in FIG. 1, comprises a powder molding press having a vertically movable die into which powder can be inserted, a feeder horizontally movable on the die for feeding powder into a die cavity provided in the die, a hopper with powder stored therein for feeding powder into this feeder, a drive source for moving the feeder horizontally on the die and controlling means for controlling this drive source and controlling movement positions of the feeder, the controlling means performing control so that a stopping position of the feeder comes in a fixed position with respect to a center position of the die cavity of the powder press die which changes in the vertical direction.

Figure 2:
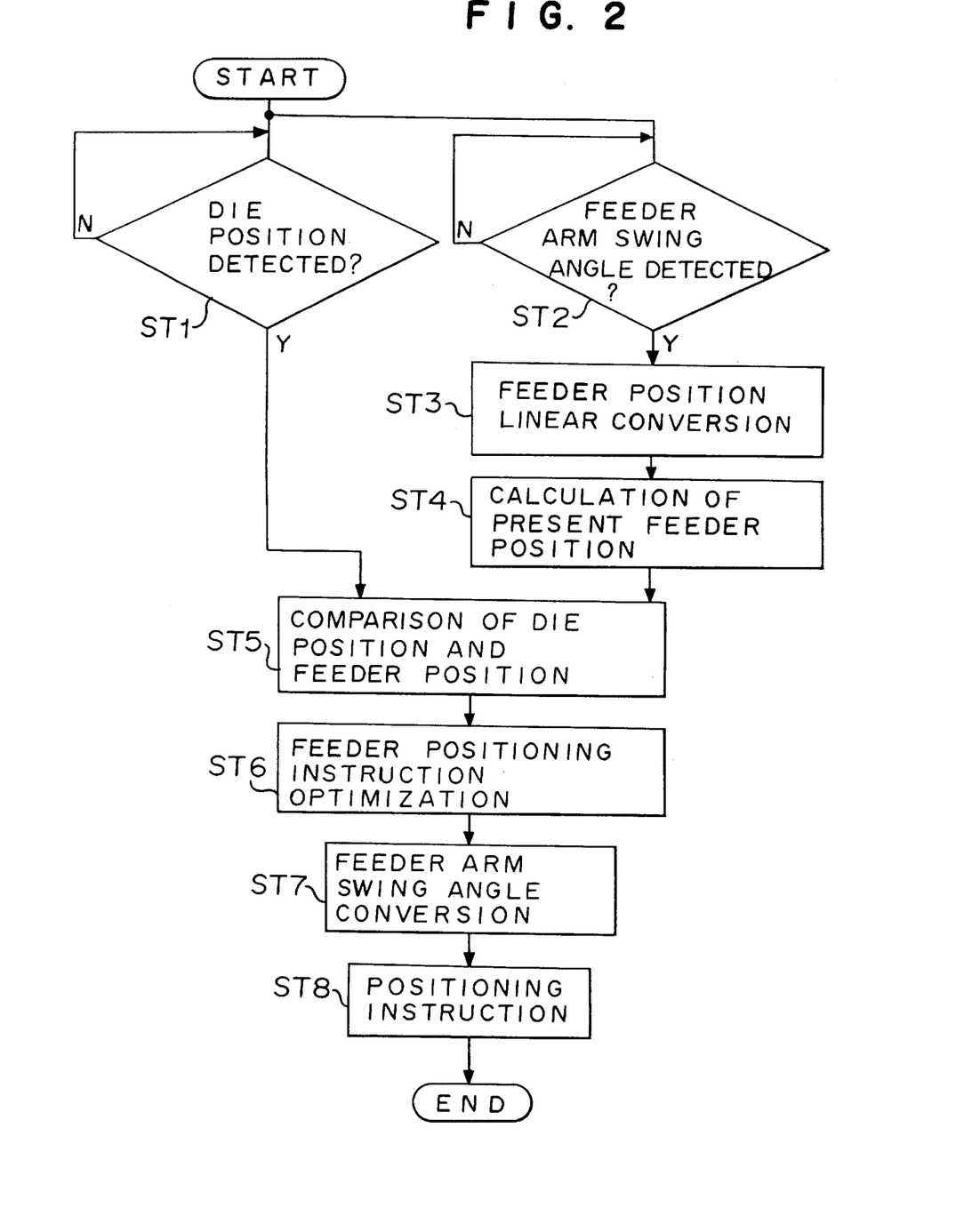
FIG. 2 is a flow chart of a preferred embodiment of a powder feed apparatus and control method thereof according to the invention.

Also, a powder feed apparatus control method provided by the invention, as an example thereof is shown in FIG. 2, comprises a feeder provided on a vertically movable die of a powder molding press for moving horizontally with respect to the die and feeding powder into the die, die position detecting means for detecting the position of the die, feeder position detecting means for detecting the position of the feeder and controlling means such as a computer into which detection outputs of the die position detecting means and the feeder position detecting means are fed and by which these outputs and reference values are operated on, control being carried out on the basis of this controlling means so that with respect to vertical movement of the die the position of the feeder becomes a center position of the die.

Figure 3:
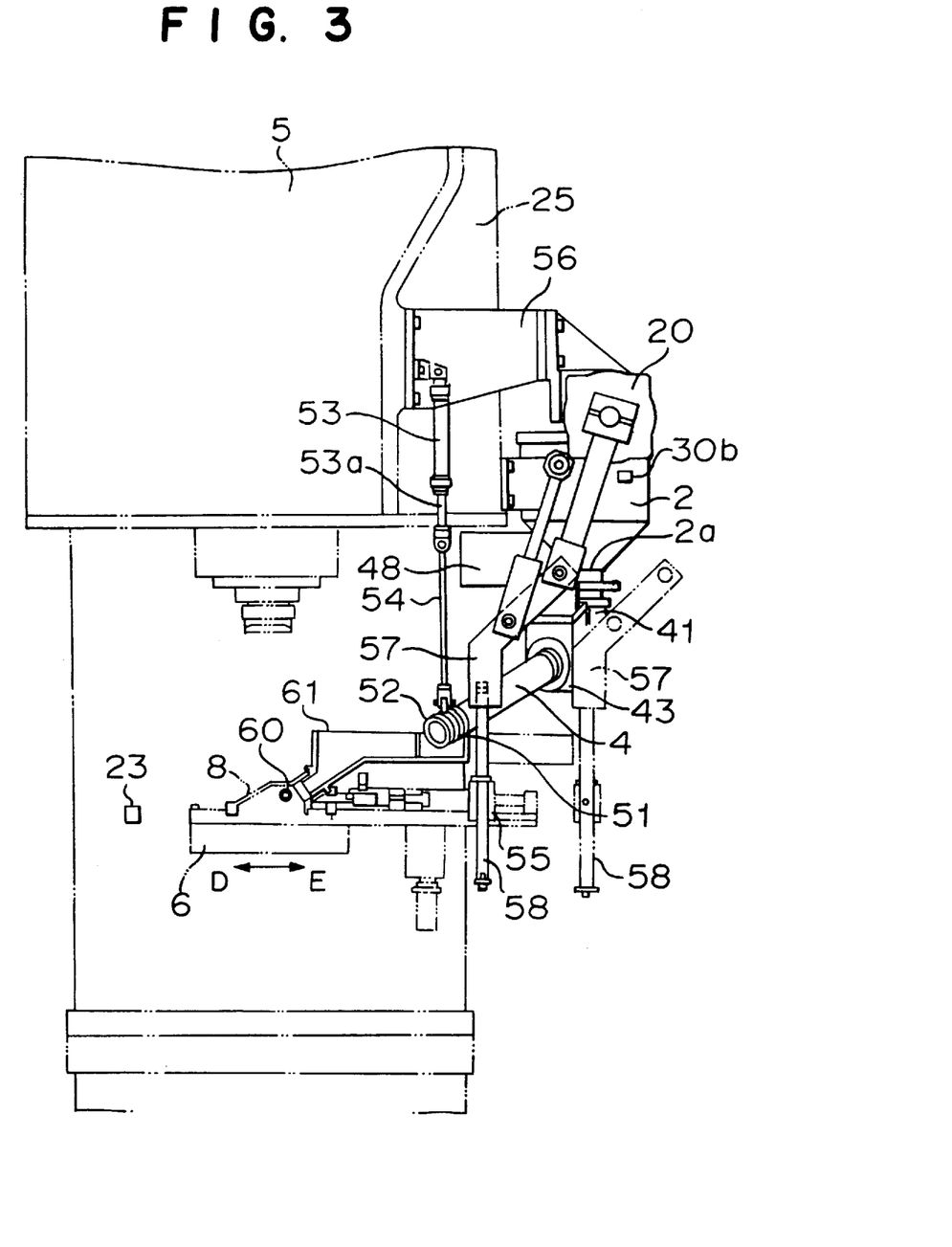
FIG. 3 is a side view showing a specific construction of a powder feed apparatus according to the invention.

Also, another powder feed apparatus control method provided by the invention, as an example thereof is shown in FIG. 3, comprises a feeder provided on a vertically movable die of a powder molding press for moving horizontally with respect to the die and feeding powder into the die, driving means for driving this feeder horizontally and horizontal position controlling means for controlling the horizontal position of the feeder, this horizontal position controlling means controlling horizontal movement or oscillation of the feeder on the basis of program data.

With a powder feed apparatus and a powder feed apparatus control method according to the invention, even if the powder molding press is a large one wherein the shape change of the compact is carried out, feeder position control of feeder sliding positions and sliding speeds or feeder oscillation or the like during charging of powder into the die is not carried out by changing mechanical elements such as a cams, and by performing control using an electronic control system, even if the shape or size of a compact is greatly changed the feeder movement can be changed very easily and the correct quantity of powder can be charged into the die.

BRIEF DESCRIPTION OF THE DRAWINGS

FIGS. 7(a) to 7(e) are views illustrating the operation of a feeder on a die plate of powder feed apparatus according to the invention;

FIGS. 9(A) to 9(D) are views illustrating the operation of a press used with a powder feed apparatus according to the invention;

DETAILED DESCRIPTION OF THE PREFERRED EMBODIMENTS

Preferred embodiments of a powder feed apparatus and a powder feed apparatus control method according to the invention will now be described in detail with reference to the accompanying drawings. FIG. 1 is a block diagram showing the functional construction of the invention, and a powder feed apparatus in which a hose method similar to that described above in reference to conventional technology is used will be described.

Referring to FIG. 1, in a powder molding press 5 a feeder 8 on a die plate 6 is movable in the horizontal direction shown by the arrow D–E and scrapes powder 3 into a die 7. Requirements of the compact side usually make it necessary for the powder feed position on the die plate 6 of the powder molding press 5 to be moved up or down whenever the compact being manufactured changes. Consequently, to move the position of the feeder 8 in the horizontal direction D–E as shown in FIG. 1 and allow it to move in the vertical direction 1 as shown with broken lines, as described above in reference to conventional technology, powder feed apparatus linkage mechanisms have had complex constructions using at least first and second levers 12 and 14 and have used a cam 16 or the like to move the feeder 8 horizontally in the direction D–E. For example, considering a case wherein the feeder 8 on the die plate 6 is moved by a linkage mechanism horizontally in the direction D–E as shown in FIG. 1, in this example rotation of a motor shaft 21 of a servo motor 20 is converted into linear motion by a rotary-linear convertor mechanism 22 and transmitted to a linkage mechanism made up of first and second levers 12 and 14 which cause the feeder 8 to undergo parallel motion so that powder 3 having fallen through a tube into the feeder 8 is scraped into the die 7.

In this example, the construction described above is provided with a position detector 23, such as a linear scale, for detecting the movement position of the die plate 6 in the vertical direction (the 1 direction), the vertical position of the die plate 6 from the position detector 23 is fed to a position detecting circuit 24 and the vertical position of the die plate is detected. A detection signal from the position detecting circuit 24 is fed through an interface including an analogue-digital convertor (ADC) 25 into a computer (CPU) 26.

The CPU 26 has ordinary memory such as a RAM 27 and a ROM 28 for work, and various programs can be inputted through a console 29 such as a keyboard.

In this example, a sensor 30 for detecting the horizontal movement position of the feeder 8 is also provided. This sensor 30 can be disposed near the feeder 8 and detect the position of the horizontal position of the feeder 8 directly or alternatively the feeder 8 position detector may for example be an encoder 30a for rotation detection mounted on the motor shaft 21 of the servo motor 20 or an angle detector 30b which detects the angle of pivot of for example the first feeder lever 12 of the linkage mechanism.

The detection output of any one of the detectors described above is fed into a feeder position detecting circuit 31 and the feeder position is detected. A feeder position signal from this feeder position detecting circuit 31 is fed through an interface including an ADC 32 into the CPU 26.

In the CPU 26 various operations are carried out on the basis of the die plate position signal and the feeder position signal and then a control signal is fed through an interface including a feeder control circuit 33 and a digital-analogue convertor (DAC) 34 to a servo driving circuit 35 and performs analogue control of the servo motor 20.

The servo motor 20 is servo-controlled on the basis of data from the feeder control circuit 33 and rotational drive thereof is transmitted to the linkage mechanism through the rotary-linear convertor mechanism 22 and moves the feeder 8 horizontally and servo-operation also able to correspond to vertical movement of the die plate 6 is performed.

The feed control flow of the CPU 26 in the function block diagram discussed above is shown in FIG. 2. Referring to FIG. 2, a first step $ST_1$ constantly monitors whether or not a die position has been detected and if NO processing returns to the start of the first step $ST_1$ and if YES processing proceeds to a fifth step $ST_5$.

A second step $ST_2$ monitors whether or not a feeder arm swing angle has been detected. In this example the powder feed apparatus has a link lever type feeder control mechanism which will be further discussed later, and therefore, in the feeder control flow, if a pivot angle θ of the first feeder lever 12 has not been detected by an angle detector 30b then processing returns to the start of the second step $ST_2$, and if angle detection has been carried out and the determination is therefore YES then processing proceeds to a third step $ST_3$.

In the third step $ST_3$, on the basis of the feeder arm swing angle θ, an operation to convert the feeder position into a straight line direction (the D–E direction) position is carried out, and in a subsequent fourth step $ST_4$ computation of the present position of the feeder 8 is carried out and this value is fed to a fifth step $ST_5$ which performs a comparison operation.

In the fifth step $ST_5$, a comparison operation of data on the present position of the feeder 8 and die position data is carried out.

In a sixth step $ST_6$, optimization of a feeder position from the console 29 taken into the RAM 27 of the CPU 26 is carried out on the basis of the comparison data of the fifth step $ST_5$. In the RAM 27, various data according to the shape, size and material and so on of the compact at the time of compact molding, such as a position from which the feeder 8 is to start advancing, an advancing speed, a pattern of oscillation during powder charging into the die cavity and a retreated position of the feeder 8, are stored.

After optimization of the feeder position is carried out in the sixth step $ST_6$, processing proceeds to a seventh step $ST_7$ wherein a feeder arm swing angle converted value is calculated and then an eighth step $ST_8$ issues a positioning instruction driving the servo driving circuit 35 and servo-controlling the servo motor 20 to a prescribed number of revolutions so that the feeder arm comes to this value of the feeder arm swing angle θ.

In the preferred embodiment described above, the feeder arm swing angle is detected and the feeder position is deduced from this angle; however, control of the feeder position can also be carried out by way of the rotary-linear convertor mechanism 22 and the first and second arms 12 and 14 by detecting the number of revolutions of the servo motor 20 and performing servo-control of the number of revolutions of this servo motor 20.

Also, a construction may alternatively be adopted wherein the feeder 8 is provided with a servo motor and moved horizontally (in the D–E direction) along a rail or a rod or the like, the feeder position is directly detected by a feeder detector 30 and the number of revolutions of a directly-coupled servo motor or the like is servo-controlled.

The specific construction of the powder feed apparatus and the driving device of the feeder 8 slidable over the die plate 6 in the horizontal direction D–E of this example will now be described with reference to FIG. 3 through FIG. 6. FIG. 3 is a side view, FIG. 4 a front view and FIG. 5 a plan view of the powder pressing apparatus, and FIG. 6 is a partly sectional side view of the powder feed apparatus.

In the figures, a hopper 2 for storing a material from which compacts are to be pressed is removably and pivotally mounted by way of a bracket 40 on a side of a press proper 5. A powder quantity controlling device 41 for controlling the weight of powder 3 discharged through a cylindrical discharge opening 2a provided at the bottom of the hopper 2 in accordance with characteristics such as its specific gravity, particle size and angle of repose is provided below the discharge opening 2a.

Figure 6:
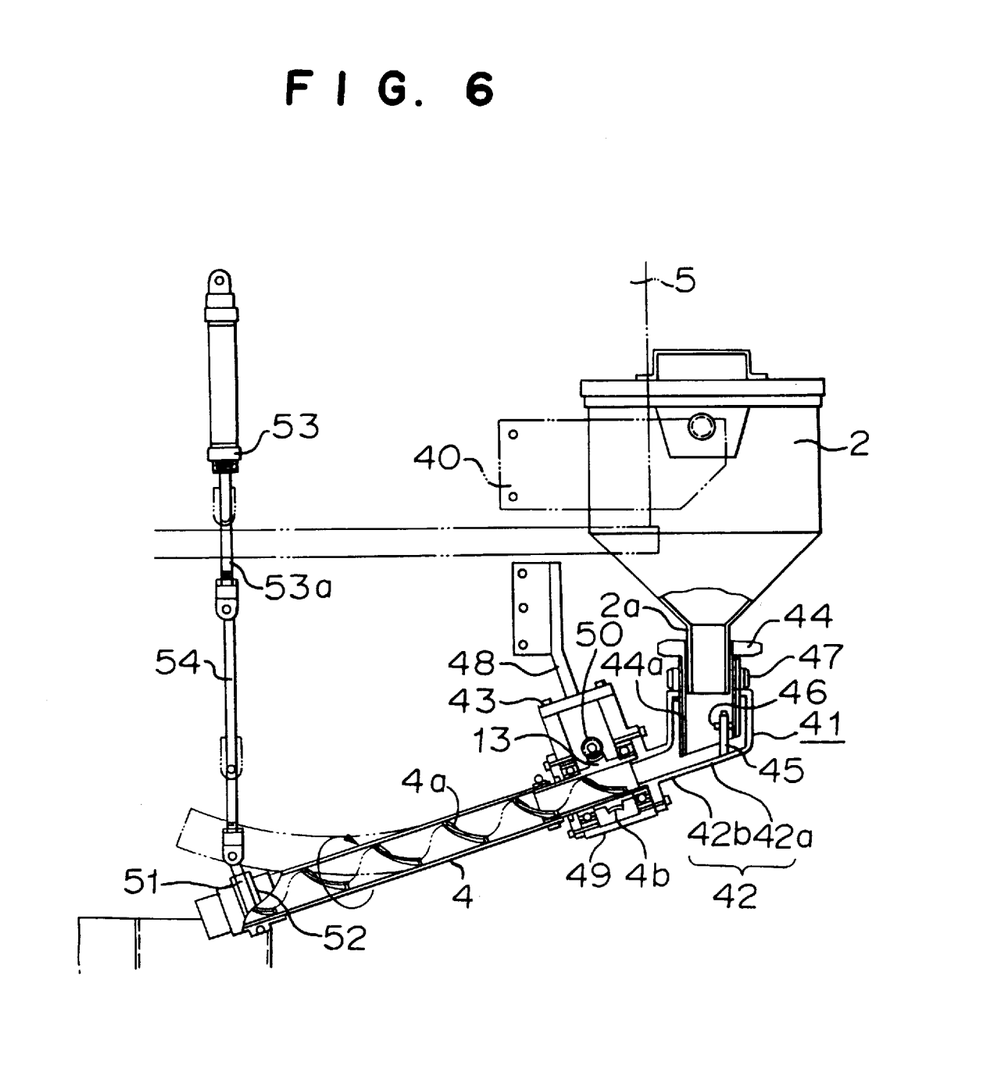
FIG. 6 is a sectional side view of a main part of a powder feed apparatus according to the invention.

As shown in FIG. 6, the powder quantity controlling device 41 is made up of a controller casing 42 shaped like a cylinder with a bottom which has a bottom part 42a and a discharge opening 42b inclined toward the press proper 5 and is disposed below the discharge opening 2a of the hopper 2 and supported by a rotary feeder device 43, a cylindrical controlling tube 44 fitted vertically movably on the outside of the discharge opening 2a of the hopper 2 and having a lower end portion thereof inserted into the controller casing 42, a nut 47 for moving this controlling tube 44 up and down screwed onto a threaded portion 44a and a guide rod 45 embedded vertically in the bottom part of the controller casing 42 for restricting turning of the threaded portion 44a on the outside thereof; the guide rod 45 is guided vertically movably with respect to a pin 46 for turning restriction provided projecting from the inner surface of a lower end portion of the controlling tube 44 and the lower end portion of the controlling tube 44 is cut diagonally so that it is parallel with the bottom part 42a of the controller casing 42.

The rotary feeder device 43 is mounted on the press proper 5 by way of a bracket 48. This rotary feeder device 43 is made up of a gearbox 49 to which is attached one end of the controller casing 42, a hose 4 disposed in communication with the discharge opening 42b of the controller casing 42 and rotatably fitted in the gearbox 49 and having a helical fin 4a formed on its inner surface and a worm wheel 4b formed on its outer surface, a worm 50 meshing with the worm wheel 4b of this hose 4 and a motor (not shown) for driving the worm 50 disposed in the gearbox 49.

The hose 4 comprises a flexible tube and by rotating integrally with the hose 4 the fin 4a feeds powder 3 supplied from the hopper 2 down the hose 4 and to a discharge opening at the lower end of the hose 4.

A ring guide tube 52 on the outside of which is relatively rotatably fitted a receiving ring 51 is fitted on the outside of the discharge opening end of the hose 4. The receiving ring 51 is connected by way of a rod 54 to a piston rod 53a of a raising and lowering cylinder 53 suspended from the press proper 5.

Figure 4:
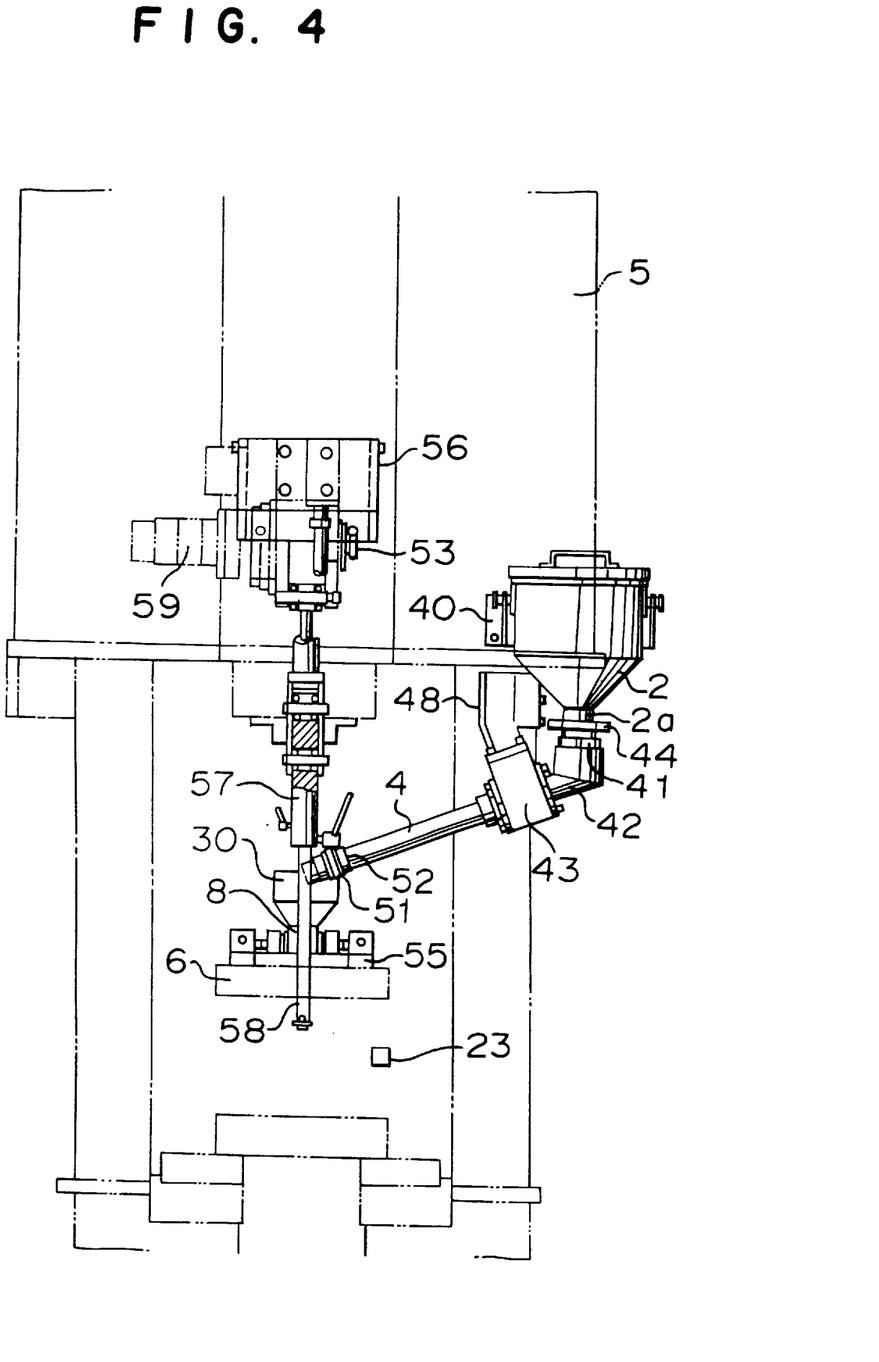
FIG. 4 is a front view of the powder feed apparatus of FIG. 3.
Figure 5:
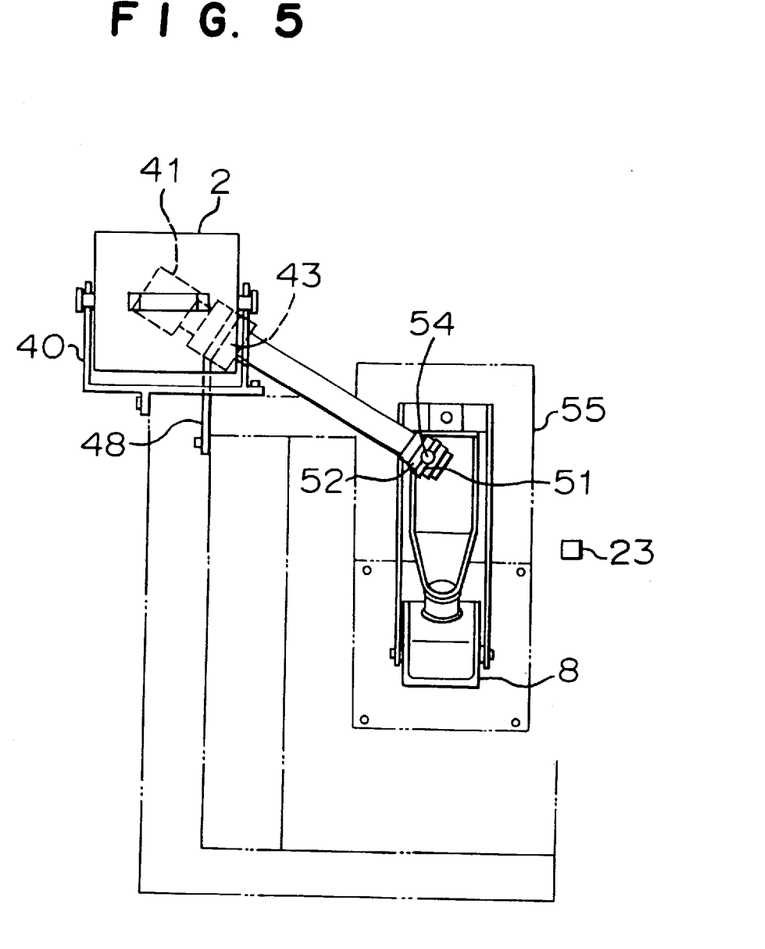
FIG. 5 is a plan view of the powder feed apparatus of FIG. 3.

As shown in FIG. 3 through FIG. 5, a feeder 8 shaped like an inverted cup is slidably disposed on the die plate 6 of the, press proper 5 by way of a slide plate 55 to feed powder into the die 7. The slide plate 55 is connected by a connecting rod 58 to a parallelogram-shaped link mechanism 57 comprising the links 12 and 14 attached to the press proper 5 by way of a bracket 56 and is driven by a hydraulic motor 59 capable of rotating in forward and reverse directions for controlling the parallelogram-shaped link mechanism 57 to slide the feeder 8 in the arrow D–E direction with respect to the die 7.

A level sensor 60 for detecting the level of the powder 3 fed into the feeder 8 through the hose 4 is provided at the top of the feeder 8, the raising and lowering cylinder 53 and the motor driving the worm 50 are controlled by the detection output of the level sensor 60 and a transfer box 61 connecting to the discharge opening of the rotary flexible hose 4 is attached to the feeder 8.

Also, the position detector 23 for detecting the vertical position of the die plate 6 is disposed within the range of vertical movement of the die plate 6 and the angle sensor 30b for detecting the pivot angle of the links of the parallelogram-shaped link mechanism 57 and thereby performing detection of the position of the feeder 8 is disposed near an arm.

In the powder pressing apparatus 5 of the construction described above, powder 3 discharged through the discharge opening 2a of the hopper 2 is fed to the rotary feeder device 43 always in a fixed quantity according to the characteristics of the powder by control of a gap between the bottom part 42a of the controller casing 42 and the lower end of the controlling tube 44 of the powder quantity controlling device 41.

Powder 3 entering the rotary feeder device 43 is fed while being mixed and pushed out by the fin 4a of the hose 4 into the feeder 8 via the transfer box 61.

Next, when a predetermined quantity of powder has been fed into the feeder 8 the powder 3 is detected by the level sensor 60 and on the basis of the detection signal of this level sensor 60 the motor rotating the worm 50 is stopped and by contraction of the raising and lowering cylinder 53 shown in FIG. 6 the hose 4 is raised as shown with broken lines and supply of unnecessary powder to the feeder 8 is stopped.

Then, as shown in FIG. 7(a) through FIG. 7(e), the servo motor 20 is driven so that the feeder 8 moves over the die plate 6 of the press proper 5 horizontally in the direction of the arrow D. The servo motor 20 is in FIG. 3 a motor for driving the parallelogram-shaped link mechanism 57 and attached to the press proper 5 by a bracket.

Figure 7:
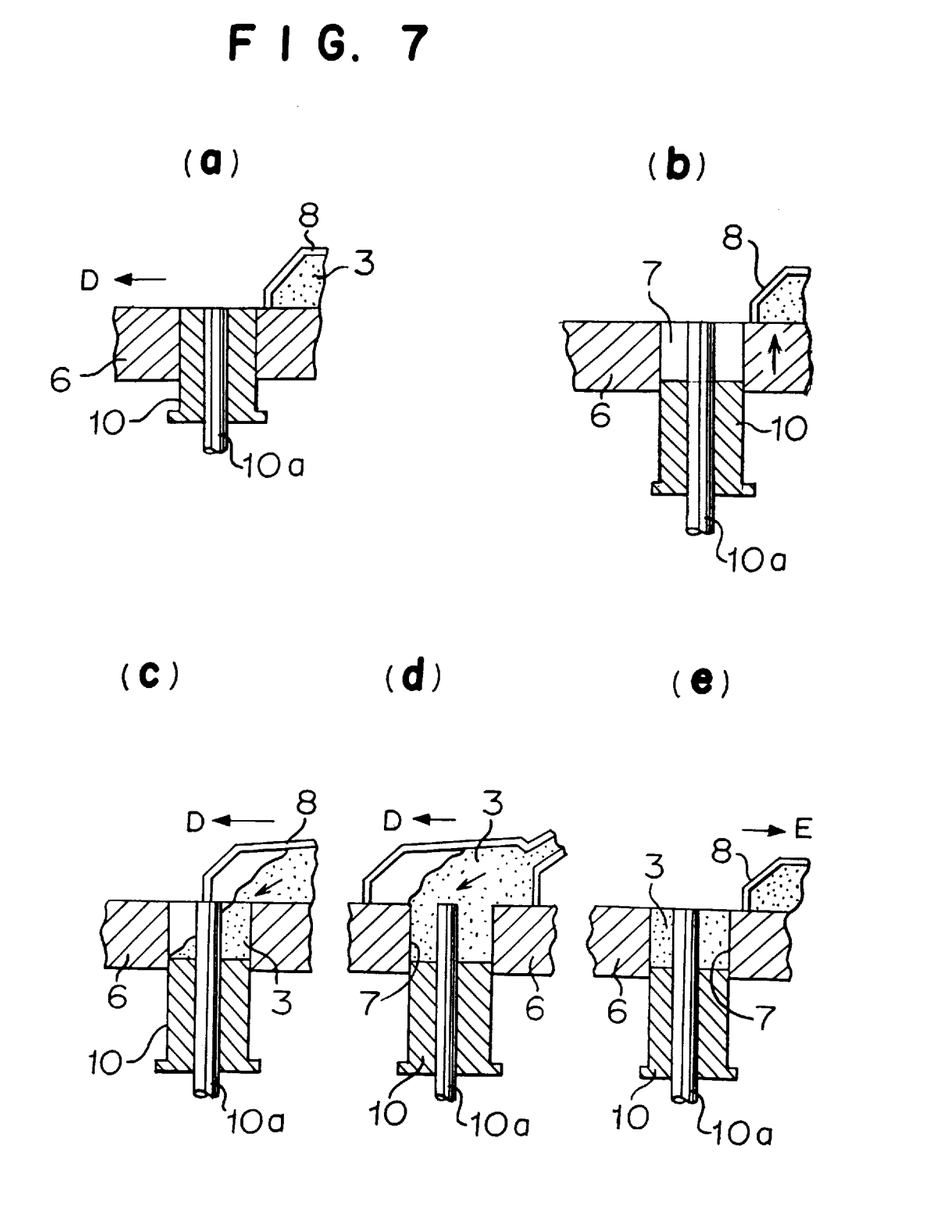

From the state shown in FIG. 7(a) immediately before the slide plate 55 is caused to slide by the connecting rod 58 by way of the parallelogram-shaped link mechanism 57 by the drive of the servo motor, the die plate 6 is raised as shown in FIG. 7(b). As a result, a cavity formed by the lower punch 10 remaining on the lower side leaving an inner rod 10a in the die 7 becomes the die 7.

Powder 3 is then scraped into the die 7 by control moving the feeder 8 in the D direction as shown in FIG. 7(c) and FIG. 7(d). When powder 3 has been charged into the die 7 forming the cavity the servo motor 20 is rotated in reverse, the feeder 8 is moved in the arrow E direction and powder 3 piled above the top of the die 7 is removed from above the die 7 together with the feeder 8.

Among powder charging methods like this, besides the kind of scraping method described above, a suction charging method, an overfill method, an underfill method and so on have also been known and widely used: the suction charging method is one wherein with the feeder 8 brought onto the die, while a cavity, i.e. the die 7, is being formed by the die plate 6 being raised the powder 3 on the die 7 is charged into the cavity by being sucked in and then the feeder 8 is moved in the E direction to fill powder into the die 7 uniformly; the overfill method is one wherein after the die plate 6 is raised the center rod 10a is raised; and the underfill method is one wherein after feeder charging into the cavity the feeder is moved in the E direction and then the die plate 6 is raised and a predetermined gap is created between the upper surface of the die plate 6 and the charged powder 3.

In all these methods, charging of the die accompanies an operation of raising the die plate 6.

The powder 3 thus charged into the die 7 is compression-molded by lowering of the upper punch 9 of the press proper 5. There are various methods for carrying out this compression molding also, and a floating die method will now be explained with reference to FIG. 8, which is a chart of characteristics showing relationships between the press characteristics of the upper punch 10 and the lower punch 9 of the press proper 5 with the powder (compact) and the feeder stroke, and FIGS. 9(A) to 9(B), which are outline views illustrating operations of a pressing process.

Figure 8:
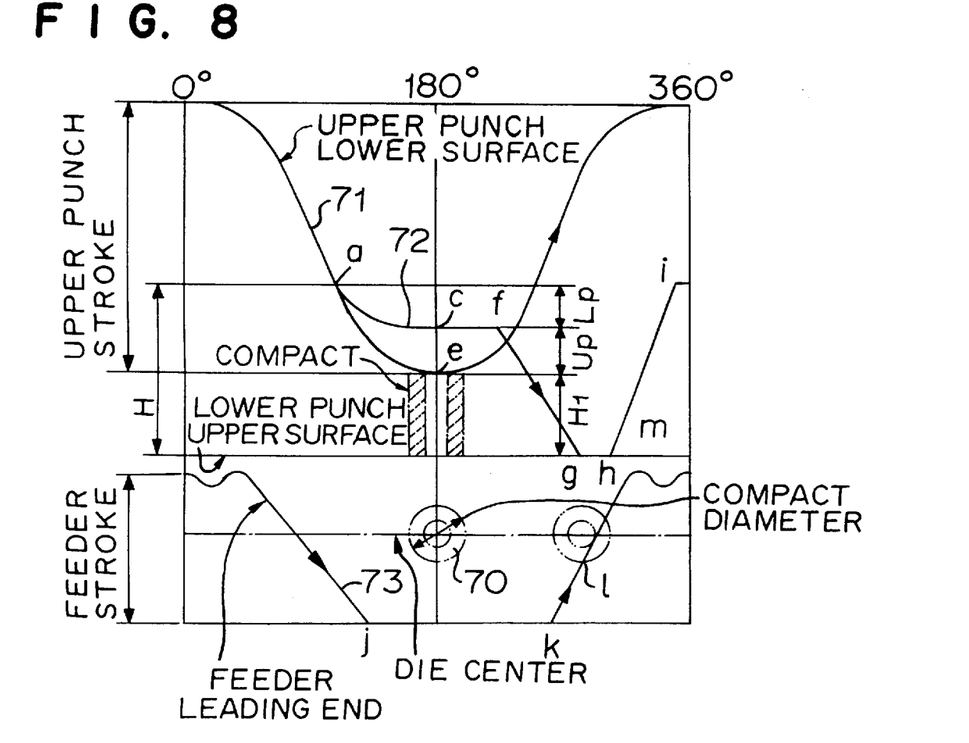
FIG. 8 is a chart showing characteristic curves of the operation of a feeder of the invention and upper and lower punches of a powder molding press.

In FIG. 8 the vertical axis shows the strokes of the upper punch 10 and the feeder 8 and the horizontal axis shows angle. H is the charge height of the powder 3 charged into the die 7 between the die plate 6 and the lower punch 9 as shown in FIG. 9(A), and the curve 71 shows the descent characteristic of the lower surface of the upper punch 10, wherein compression by the upper punch 10 commences at the point a.

Up is the range of the upper punch compression, Lp is the range of the lower punch compression and at the point e compression by the upper punch 10 is complete.

Compression by the lower punch 9 is started by die floating at the point a and follows the curve 72 and at the point c compression by the lower punch 9 is complete. That is, FIG. 9(B) shows the state at point a at the start of compression by the upper punch and the lower punch and FIG. 9(C) shows the state at the point e at the end of compression wherein the powder 3 has been formed into a compression-molded compact 70.

The upper punch 10 moves up along the curve 71 from the point e and at the point f pullout of the upper punch 10 is started and at the point g pullout is complete and the die plate 6 descends as shown in FIG. 9(D).

At the point h, charging is started and the die plate 6 rises and at the point i return to the charge depth H of the die 7 is complete.

The curve 73 shows the movement timing of the leading end of the feeder 8 in the D–E movement direction; at the point k the feeder 8 starts to advance (D direction movement), at the point l scraping of the powder 3 begins and at the point m charging of the powder 3 into the die 7, i.e. the cavity, is complete. Therefore, charging of powder into the die 7 is carried out in the period l–m and in the period m-j the feeder 8 retreats (E direction movement) and feeder retreat ends at the point j.

Figure 10:
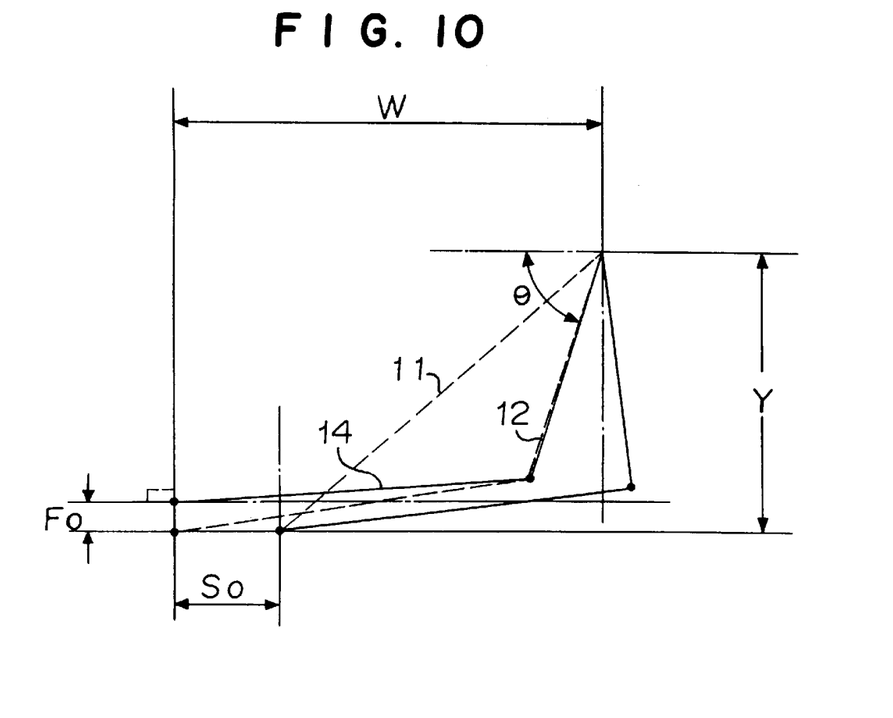
FIG. 10 is a diagram illustrating a linkage construction for operating a feeder of the invention.

As described above, because the die plate 6 moves up and down, as the linkage mechanism for controlling the horizontal sliding movement of the feeder 8, for example first and second links 12 and 14 are used as shown in FIG. 10 and if the stroke through which the feeder 8 is advanced and retreated in the D–E direction is written $S_0$ and the stroke of the feeder 8 caused by ascent and descent of the die plate 6 is called $F_0$, the angle (position) of the first arm 12 is written $\theta$, the greatest distance (the lower end) from the drive support point O of the charging position of the powder 3 in the die 7 is written Y, the distance from the drive support point O to the position of greatest advance of the feeder 8 is written W and the distance between the support point O and the feeder 8 is written $l_1$, when the value of this $l_1$ is 700 mm and the stroke $F_0$ of the die plate 6 is between 0 and 40 mm the relationship between the relative position $\delta$ of the feeder and the angle $\theta$ takes the values shown in Table 1.

TABLE 1

| $F_0$ | $\delta$ | $\theta$ (degrees) |
| --- | --- | --- |
| 40 | 691.303 | 9.041 |
| 30 | 689.637 | 9.871 |
| 20 | 687.822 | 10.703 |
| 10 | 685.850 | 11.540 |
| 0 | 683.739 | 12.374 |

As shown above, the difference between the left and right positions of the feeder at the lowest and the highest positions of the die plate 6, i.e. of the feeder 8, as long as the lengths of the levers are not changed, becomes a difference of about 7.5 mm, and when the lever length has been changed manually using cams or the like as has been done conventionally this adjustment work has been very difficult and also has had poor reproducibility.

In this example, on the other hand, because a detection output of the position detector 23 for detecting the vertical position of the die plate 6 and a detection output of a sensor 30, 30a or 30b for detecting the feeder position are fed into the CPU 26 and the feeder drive motor is servo-controlled by the CPU 26, even with respect to small changes of the kind shown in Table 1, it is possible to carry out accurate servo control and it is possible to stop the feeder 8 in a fixed position on the die 7 of the die plate 6, that is, the stopping position of the feeder with respect to the stopping position of the press proper.

Also, by performing servo control so as to change the amount of movement a little at a time at any predetermined position when advancing the feeder 8 (D direction movement), controlling so as to describe a smooth continuous curve without shocks and performing servo control so as to conduct oscillating movement applying shocks midway through the advance movement can be carried out easily. It is also possible to read out data constituted to describe predetermined movement curves on the basis of movement data stored in advance in a ROM or the like on the basis of detected data and control the feeder 8 on the basis of the stored data.

Furthermore, a required number of feeder movement patterns necessary for powder supply for compacts may be programmed and stored in memory and switched among and used to control the feeder according to the shape, dimensions and material of the compact.

In the preferred embodiments described above, examples wherein link levers are used as a mechanism for moving the feeder and a servo motor is controlled were described, but it is also possible to drive the feeder directly with a linear motor or the like and servo control this linear motor, or cam-drive the feeder.

As described above in detail, according to a powder feed apparatus and control method thereof of the invention, even if the type of the molded compact changes it is possible to use an optimum feeder movement pattern and therefore nonuniformity in density of the compact, dispersion in weight per unit and affects on the accuracy of the thickness (parallelism) can be minimized.

Also, changing the feeder movement pattern does not necessitate skilled work such as changing cam combinations, and anyone can safely and easily carry out selection of an optimum pattern.

Furthermore, compared to methods such as those wherein feeder movement changes are carried out using cams, it is possible to stop the feeder in a fixed position with a link mechanism having a simple structure even with respect to vertical position changes of the die plate.

Even in cases where the compact diameter and the feeder internal diameter are extremely small, precise positioning is possible and reproducibility does not become a problem.

Also, because the position of the leading edge of the feeder can be controlled freely there are numerous benefits such as that even in cases where an ejected compact is swept out with the leading end of the feeder this kind of work can be carried out easily.

Figure 9:
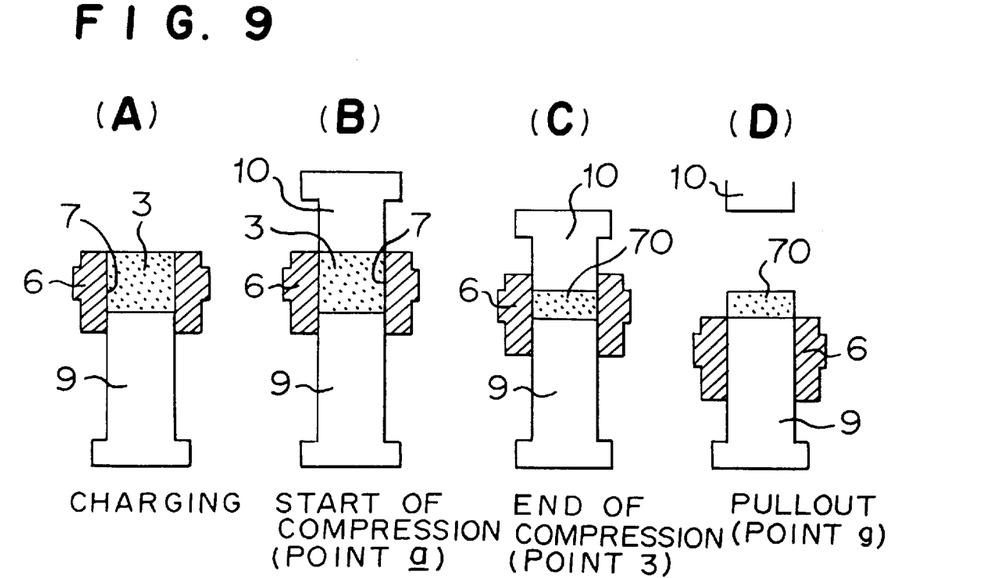
Figure 11:
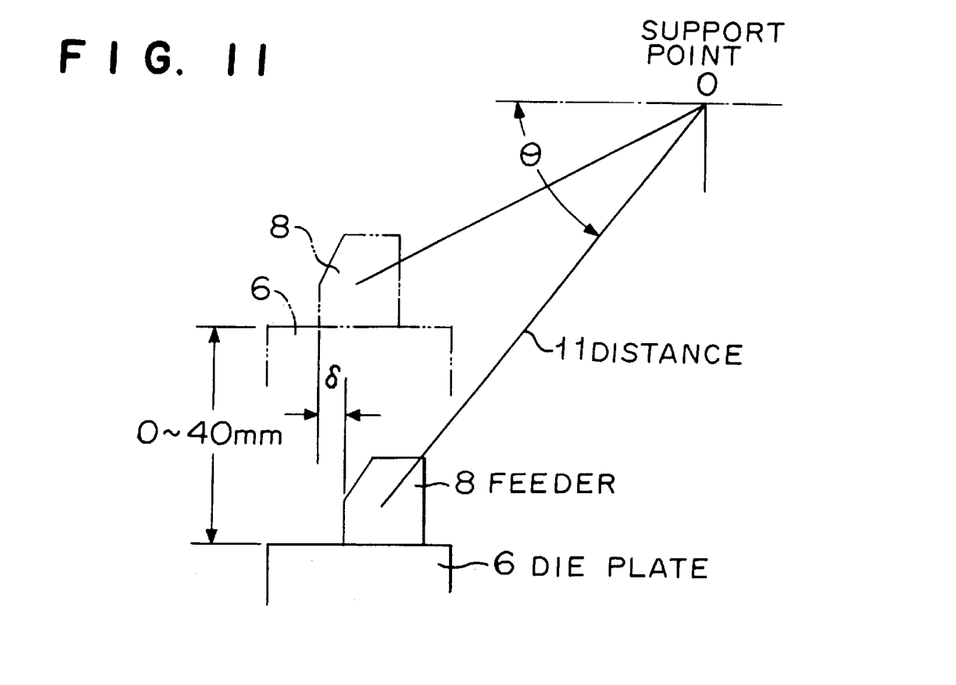
FIG. 11 is a diagram illustrating the relationship between a linkage construction for operating a feeder of the invention and a die plate.

FIG. 1
20 servo motor
22 rotary-linear convertor mechanism
23 position detector
24 position detecting circuit
29 console
31 feeder position detecting circuit
33 feeder control circuit
35 servo driving circuit
FIG. 2
START
ST1 die position detected?
ST2 feeder arm swing angle detected?
ST3 feeder position linear conversion
ST4 calculation of present feeder position
ST5 comparison of die position and feeder position
ST6 feeder positioning instruction optimization
ST7 feeder arm swing angle conversion
ST8 positioning instruction
END
FIG. 8
1 upper punch stroke
2 feeder stroke
3 upper punch lower surface
4 compact
5 lower punch upper surface
6 feeder leading end
7 die center
8 compact diameter
FIG. 9
1 charging
2 start of compression (point a)
3 end of compression (point 3)
4 pullout (point g)
FIG. 11
support point O
distance 11
8 feeder
6 die plate

What is claimed is:

1. A powder feed apparatus comprising:

a powder molding press having a die which is vertically movable during operation of the press and into which powder can be inserted;

die position detecting means for detecting the vertical position of the die during the press operation;

a feeder horizontally movable on the die for feeding powder into a die cavity provided in the die for pressing;

feeder position detecting means for detecting the position of the feeder during the press operation;

a hopper with powder stored therein for feeding powder into the feeder;

a drive source for moving the feeder horizontally on the die for feeding the powder to the die cavity; and controlling means for receiving outputs from the die position detecting means and the feeder position detecting means and operating on the outputs and controlling the relative positions of the press and feeder during the press operation, wherein the controlling means performs control of the press so that a stopping position of the feeder is fixed with respect to a center position of the die cavity of the vertically movable die for feeding of powder to the die cavity during the operation of the press.

* * * * *